INVENTORS.
HERBERT EDWARD WOODCOCK
FRANCIS SIMPSON
WILLIAM CLAYTON

March 31, 1970  H. E. WOODCOCK ET AL  3,503,226
STRAIGHT BAR KNITTING MACHINES
Filed Oct. 30, 1967  15 Sheets-Sheet 9

INVENTORS.
HERBERT EDWARD WOODCOCK
FRANCIS SIMPSON
WILLIAM CLAYTON
BY
Paul & Paul
ATTORNEYS.

March 31, 1970  H. E. WOODCOCK ET AL  3,503,226
STRAIGHT BAR KNITTING MACHINES

Filed Oct. 30, 1967  15 Sheets-Sheet 10

INVENTORS.
HERBERT EDWARD WOODCOCK
FRANCIS SIMPSON
WILLIAM CLAYTON

BY Paul & Paul
ATTORNEYS.

March 31, 1970 H. E. WOODCOCK ET AL 3,503,226
STRAIGHT BAR KNITTING MACHINES
Filed Oct. 30, 1967 15 Sheets-Sheet 12
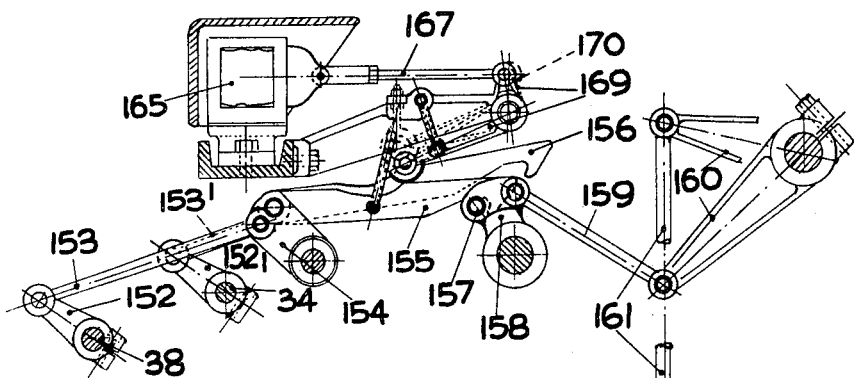
FIG.12.
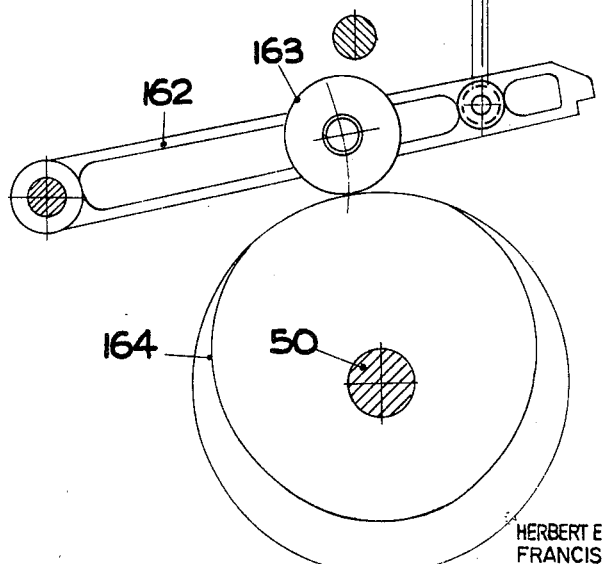
INVENTORS.
HERBERT EDWARD WOODCOCK
FRANCIS SIMPSON
WILLIAM CLAYTON
BY Paul + Paul
ATTORNEYS.

March 31, 1970  H. E. WOODCOCK ET AL  3,503,226
STRAIGHT BAR KNITTING MACHINES
Filed Oct. 30, 1967  15 Sheets-Sheet 15

INVENTORS.
HERBERT EDWARD WOODCOCK
FRANCIS SIMPSON
WILLIAM CLAYTON

BY  Paul + Paul
ATTORNEYS.

United States Patent Office 3,503,226
Patented Mar. 31, 1970

3,503,226
STRAIGHT BAR KNITTING MACHINES
Herbert Edward Woodcock, Loughborough, England, Francis Simpson, Wilton Dean, Hawick, Scotland, and William Clayton, Rawlatts Hill, England, assignors to The Bentley Machine Development Company Limited
Filed Oct. 30, 1967, Ser. No. 681,058
Claims priority, application Great Britain, Nov. 5, 1966, 49,686/66
Int. Cl. D04b 15/04, 11/06
U.S. Cl. 66—96                                              11 Claims

ABSTRACT OF THE DISCLOSURE

A straight bar knitting machine having lacing mechanism comprising two half length rows of transfer points selectively operable by two half rows of sliders in a narrowing head which in its upward movements carries the sliders into selective cooperation with racked pattern drum selected selector elements of stationary selecting mechanism, the two half rows of points and sliders being adjustably displaced towards and away from each other for sideways loop transference by the selected points one or more needle distances, and there being inner and outer control devices rotationally and laterally displaceable to be operable on small groups of the selector elements for blanking out the pattern and fashioning on outer groups of selvedge needles and V-neck selvedge needles, if required, and the outer control devices having either inner portions for controlling filling up half points for use after widening on the outer groups of the needles or outer portions for fashioning by outer two selvedge points only.

---

Figure 1:
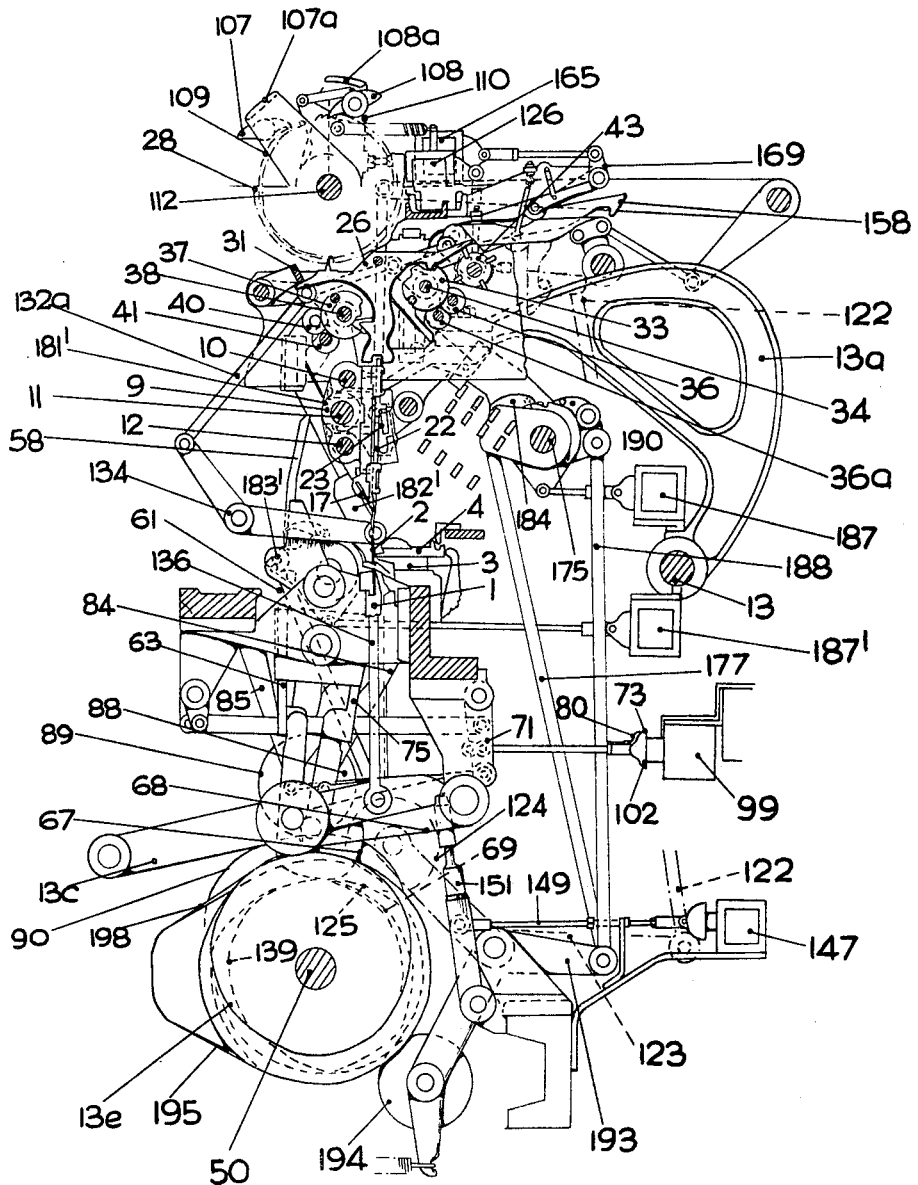

Reference is made to British patent application No. 49,686/66 dated Nov. 5, 1966, The Bentley Machine Development Company Limited, from which priority is claimed.

This invention is for improvements in or relating to straight bar knitting machines and concerns lacing mechanisms thereof which enable the machine to knit fabric having lace patterns. These mechanisms usually employ loop transfer points which are individually movable and are selectable by pattern drum or jacquard mechanism to cooperate with the needles and effect selective loop transference according to required patterns.

Heretofore there have been drawbacks with these mechanisms such as having to displace the drum or jacquard mechanism and assoicated selector levers bodily together for each selection, which incidentally can undesirably apply various tensions to the transfer points; having to change jacquard cards or the drum pattern for every different width of fabric required; and other drawbacks relative to fashioning of the fabric.

An object of the invention is to provide lacing mechanism of such improved construction that the above drawbacks are avoided.

The invention provides a straight bar knitting machine wherein lace patterning, and if desired fashioning, is effected by the use of a row of flexible transfer points operable in the narrowing head, a row of point controlling elements movable with the narrowing head and displaceable therein between an inoperative position and an operative position deflecting the points into position for cooperating with the needles, a selecting mechanism constructed and arranged to have selective cooperation with the point controlling elements, and means for effecting relative cooperating movements between the narrowing head and the selecting mechanism. Conveniently, the selecting mechanism is stationary relative to the narrowing head, and cooperation between the selecting mechanism and the point controlling elements is effected by the raising movements of the narrowing head. Conveniently, also the selecting mechanism comprises a main pattern selecting mechanism and control devices operable for control of selvedge groups of the point controlling elements. The point controlling elements are conveniently frictionally mounted sliders which are selectably slidable from the inoperative position to an operative position deflecting the points and having a releasable catch engagement therewith. The main selecting mechanism conveniently comprises a pattern drum and selector elements and the latter are shaped to provide a portion for cooperation at one location with the pattern drum, a portion for cooperation at another location with the point controlling elements, and portions for cooperation at further locations with the control devices to blank out the pattern. Conveniently, the portion for cooperation with the point controlling elements comprises spaced downwardly projecting portions, the selector elements are pivotally mounted for selective displacements, and the displacements are in one direction by the pattern drum to present one of the downwardly projecting portions to the point controlling elements and in the opposite direction by the control devices to present the other downwardly projecting portion to the point controlling elements.

The control devices are conveniently narrow drum devices which have plain surfaces for blanking out the patterns, peripheral recesses for rendering of the drums operative and inoperative, and which are adjustably displaceable both rotationally and laterally under control of cam operated mechanism and solenoid operated trip mechanism for blanking out the pattern and fashioning purposes.

The row of point controlling elements is conveniently divided into two side half groups displaceable towards and away from each other by rods movable in opposite directions under control of solenoids and cam operated mechanism such as cam slide or lead screw mechanism. The control devices conveniently comprise two control devices for outer selvedge groups of the selector elements, and two control devices for inner selvedge groups of the selector elements for V-neck fashioning control. At least the outer control devices may be adapted for control of filling up points, or outer fashioning points.

The invention also provides straight bar knitting machine lacing mechanism comprising, in a narrowing head, a row of loop transfer points which correspond to a row of fabric forming needles and which are capable of being deflected to adopt either an operative attitude suitable for loop transferring cooperation with the needles or an inoperative attitude for noncooperation with the needles when the narrowing head is moved toward the needles, a row of point controlling elements which correspond to the row of points and which are capable of being displaced in the head either to operative position deflecting the points or to inoperative position not deflecting the points, a selecting mechanism comprising a row of pattern controlled selector elements which are selectively moved for interaction with corresponding point controlling elements to deflect corresponding points leaving the remaining points undeflected, resetting means for resetting those elements which are thus operatively selected, and mounting means for mounting the selecting mechanism stationarily adjacent the narrowing head with portions of the selector elements selectively movable into and out of a position in operative alignment with portions of the point controlling elements for the interaction of the elements to be effected by movement of the narrowing head towards the stationary selecting mechanism.

Figure 2:
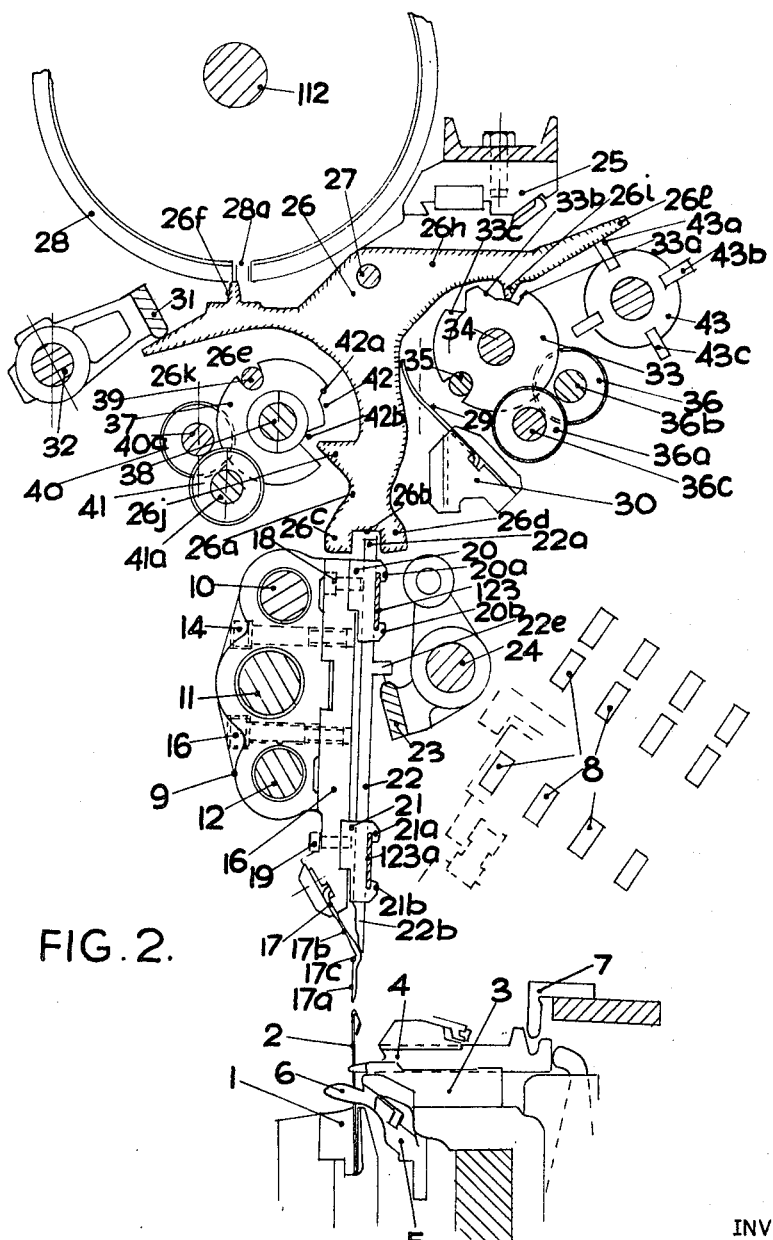
Figure 3:
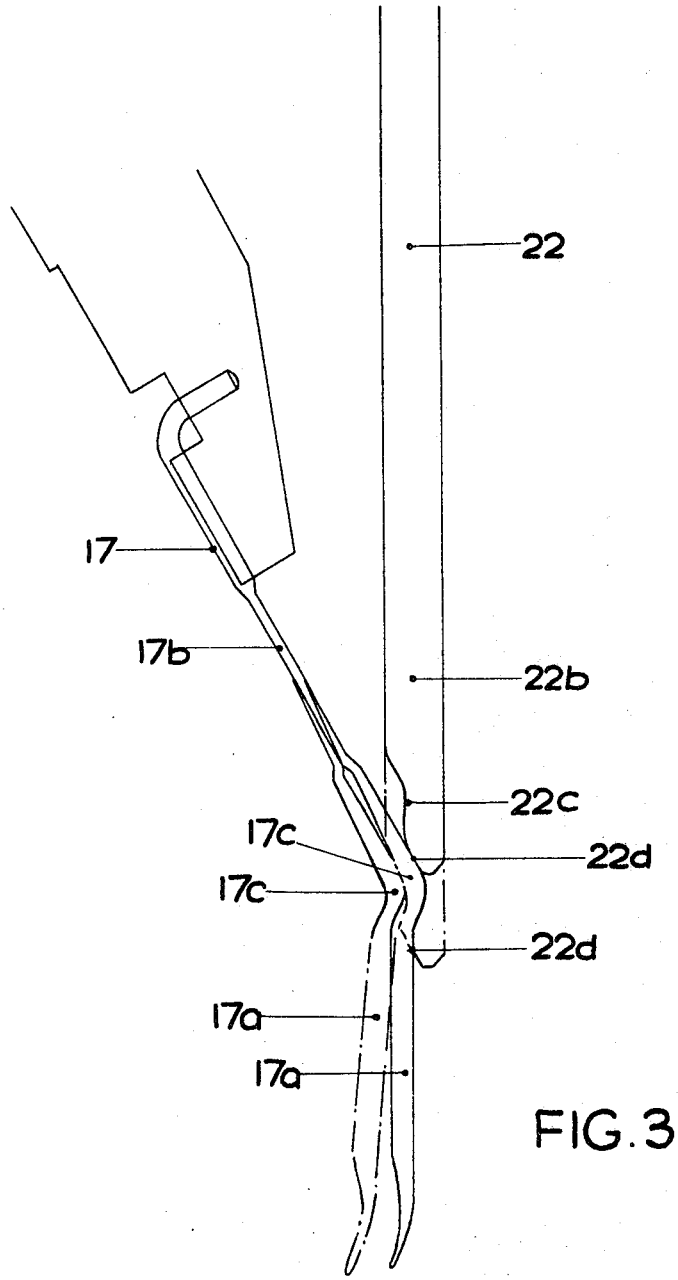
Figure 4:
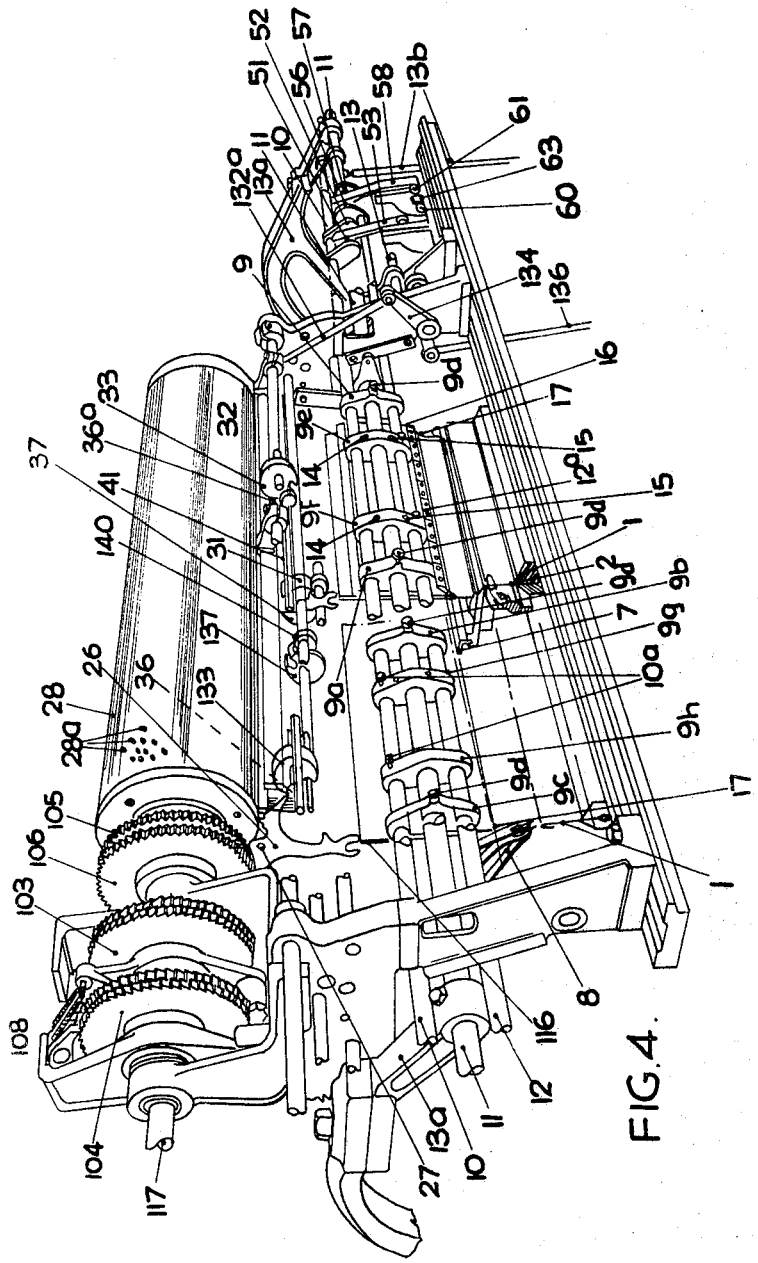
Figure 5:
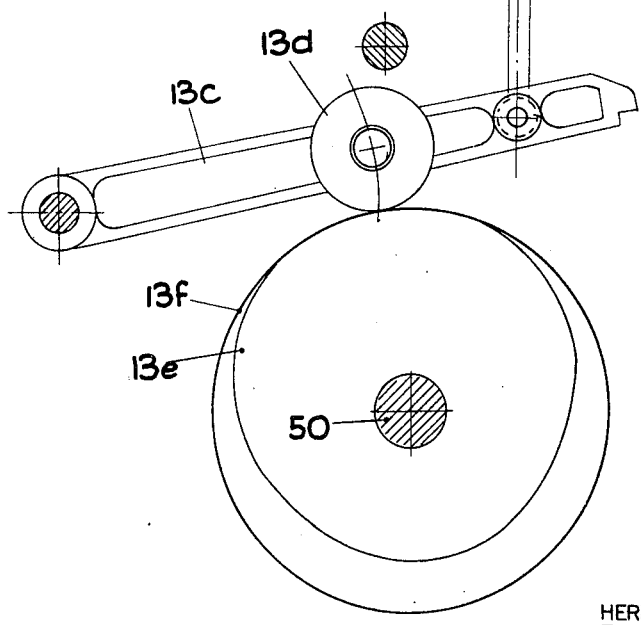
Figure 6:
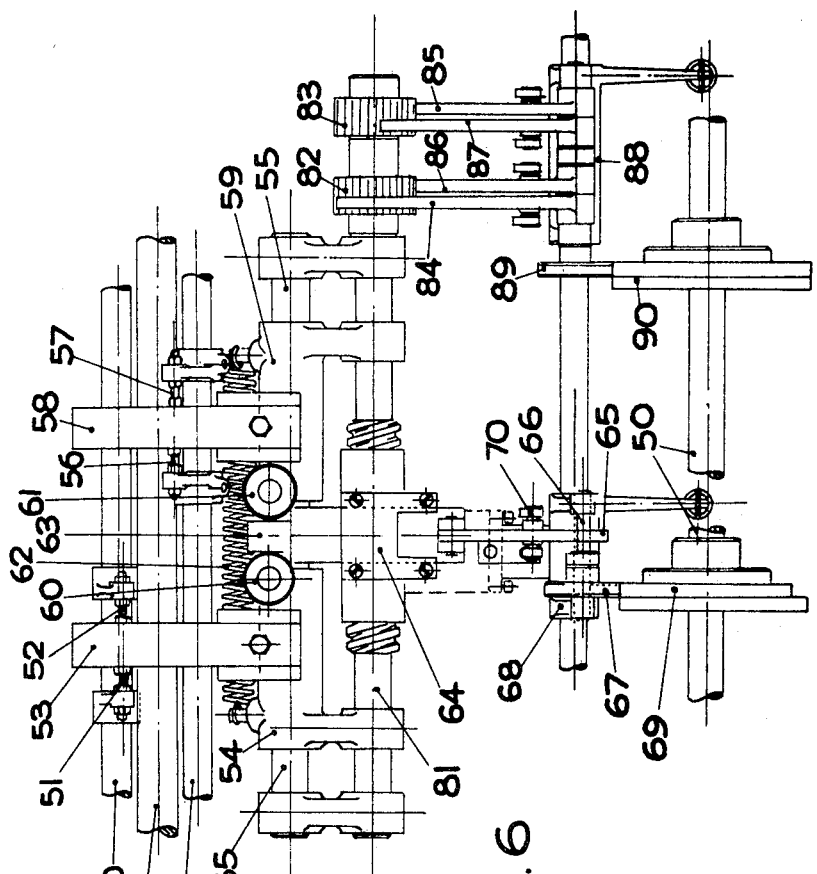
Figure 7:
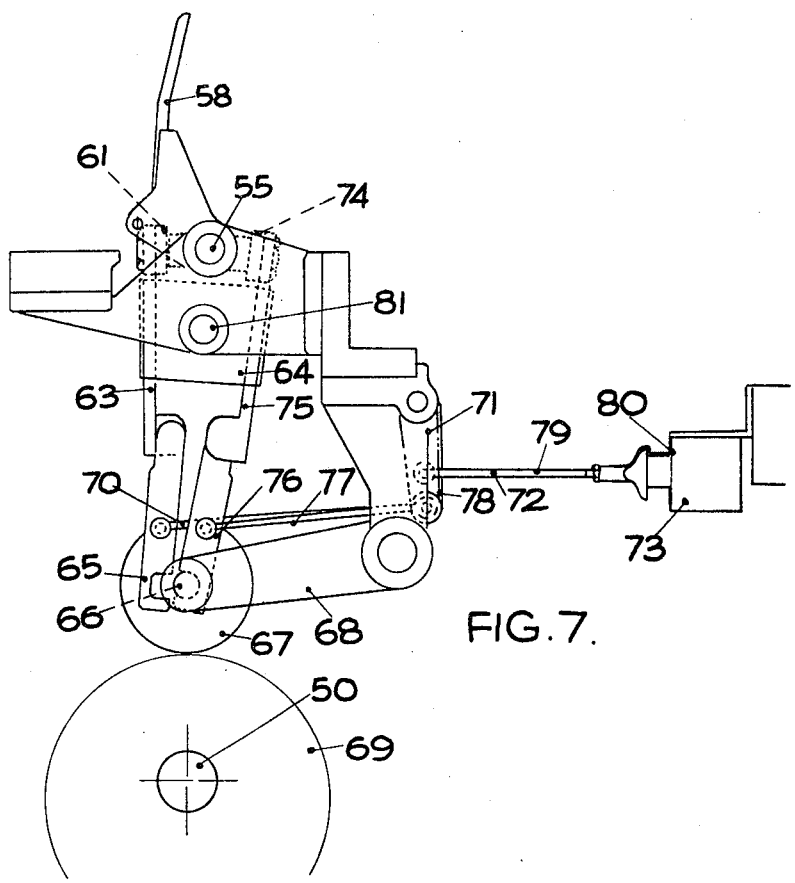
Figure 8:
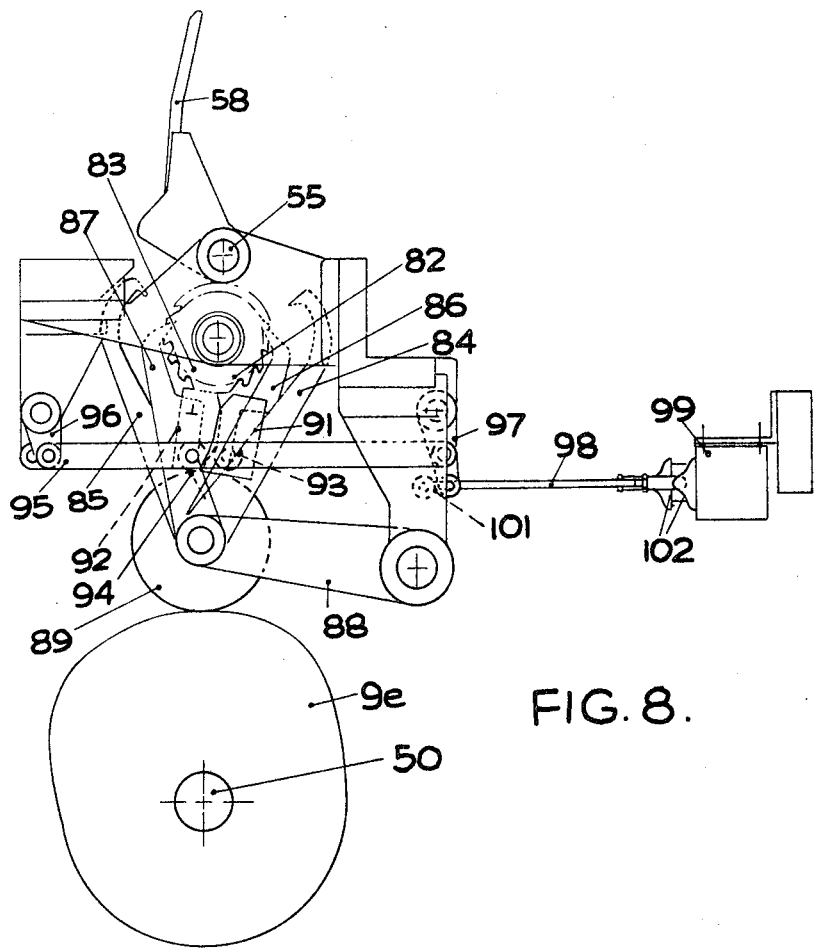
Figure 9:
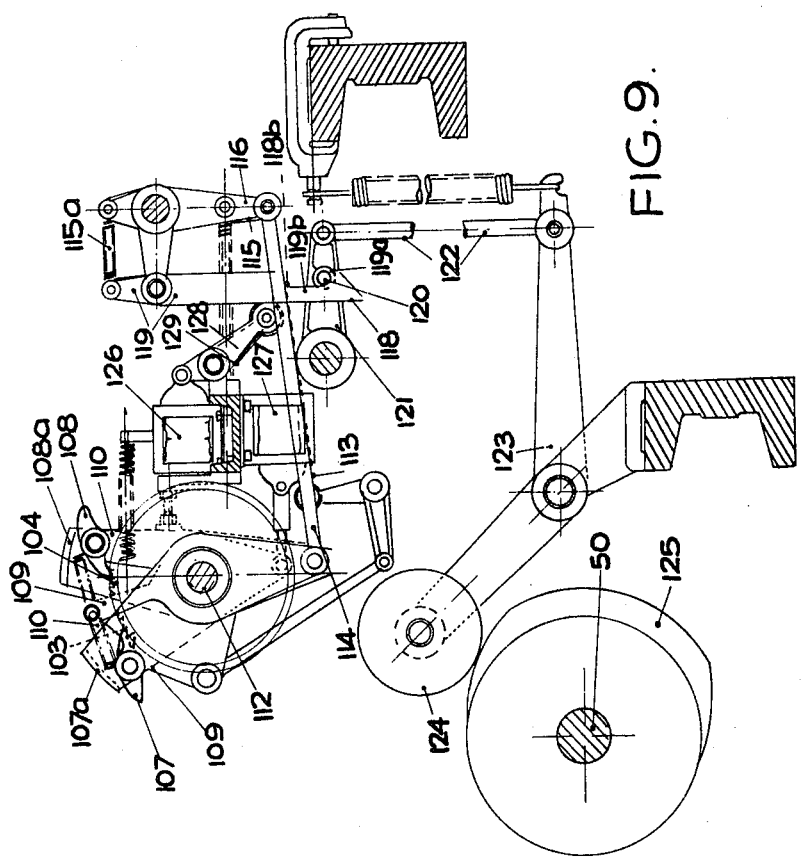
Figure 10:
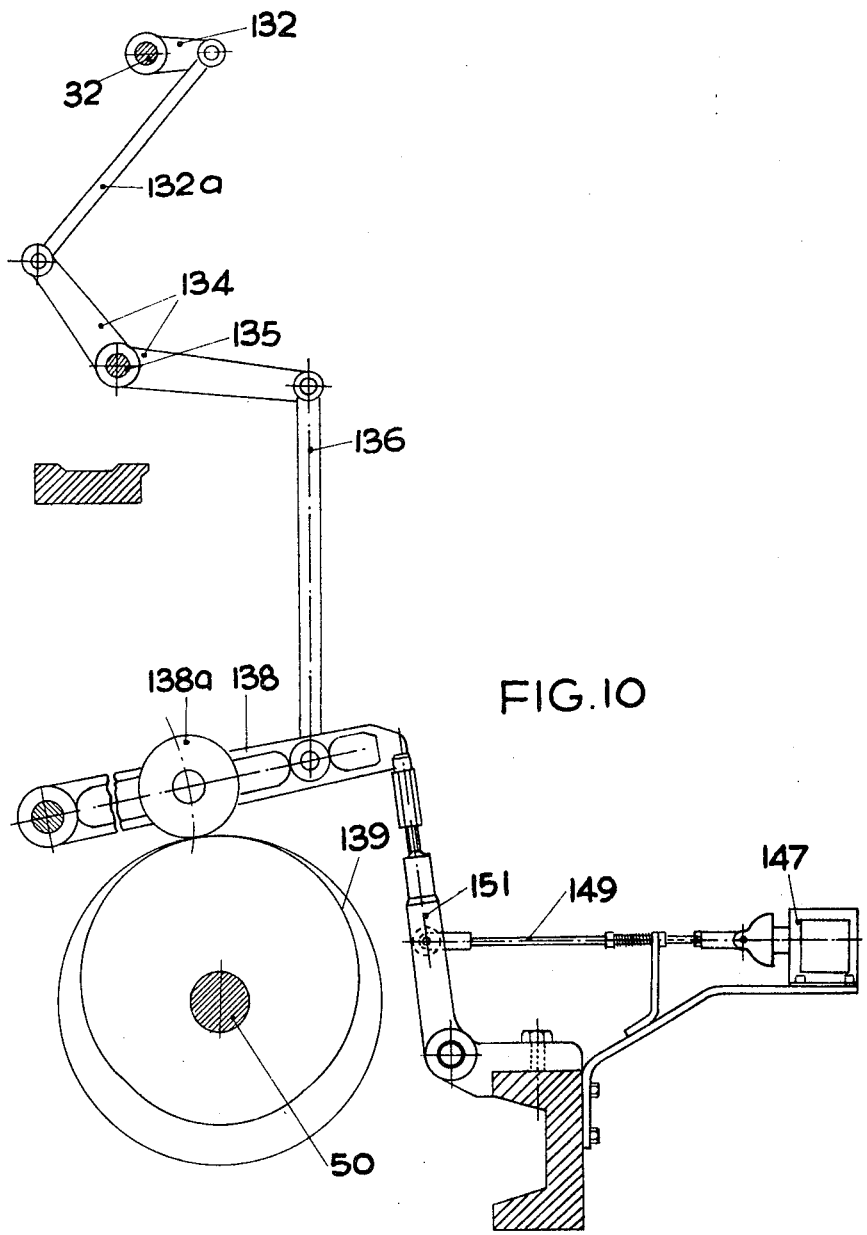
Figure 11:
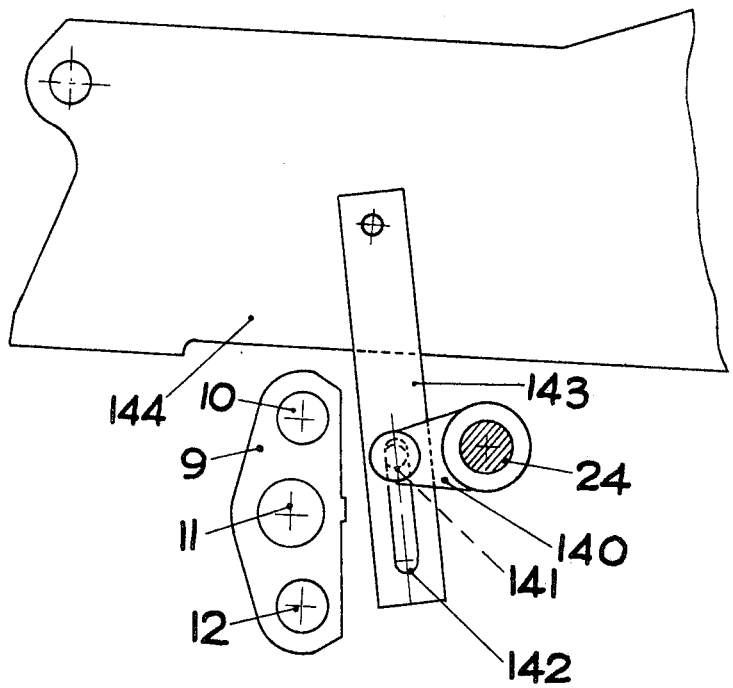
Figure 13:
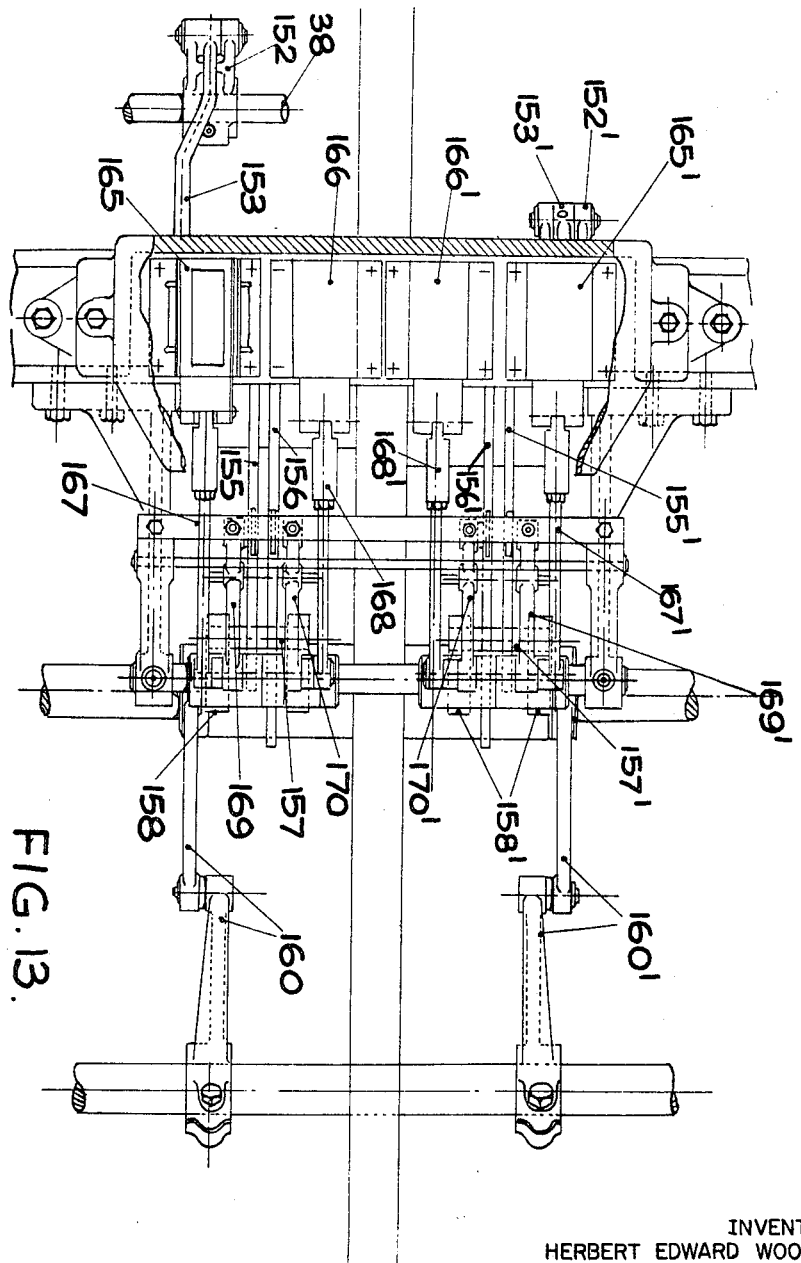
Figure 14:
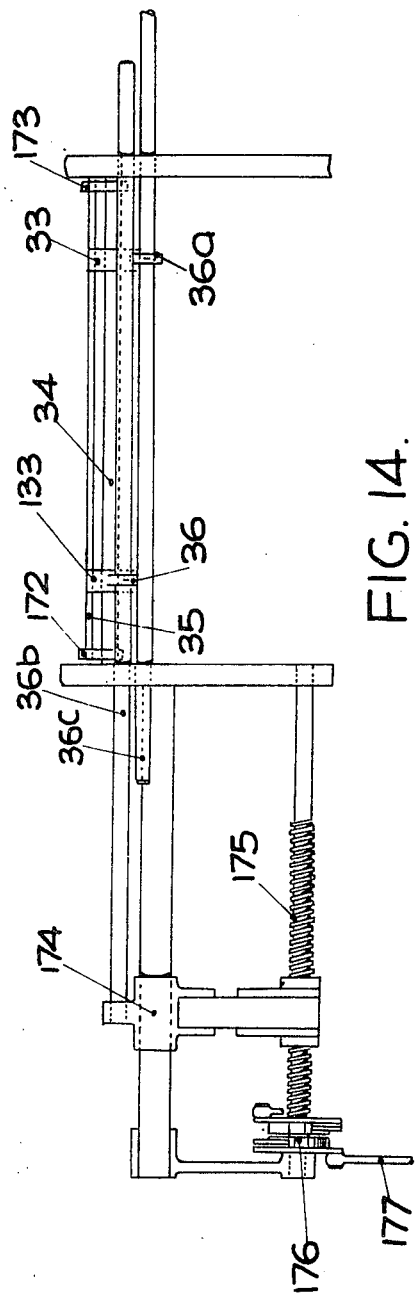
Figure 15:
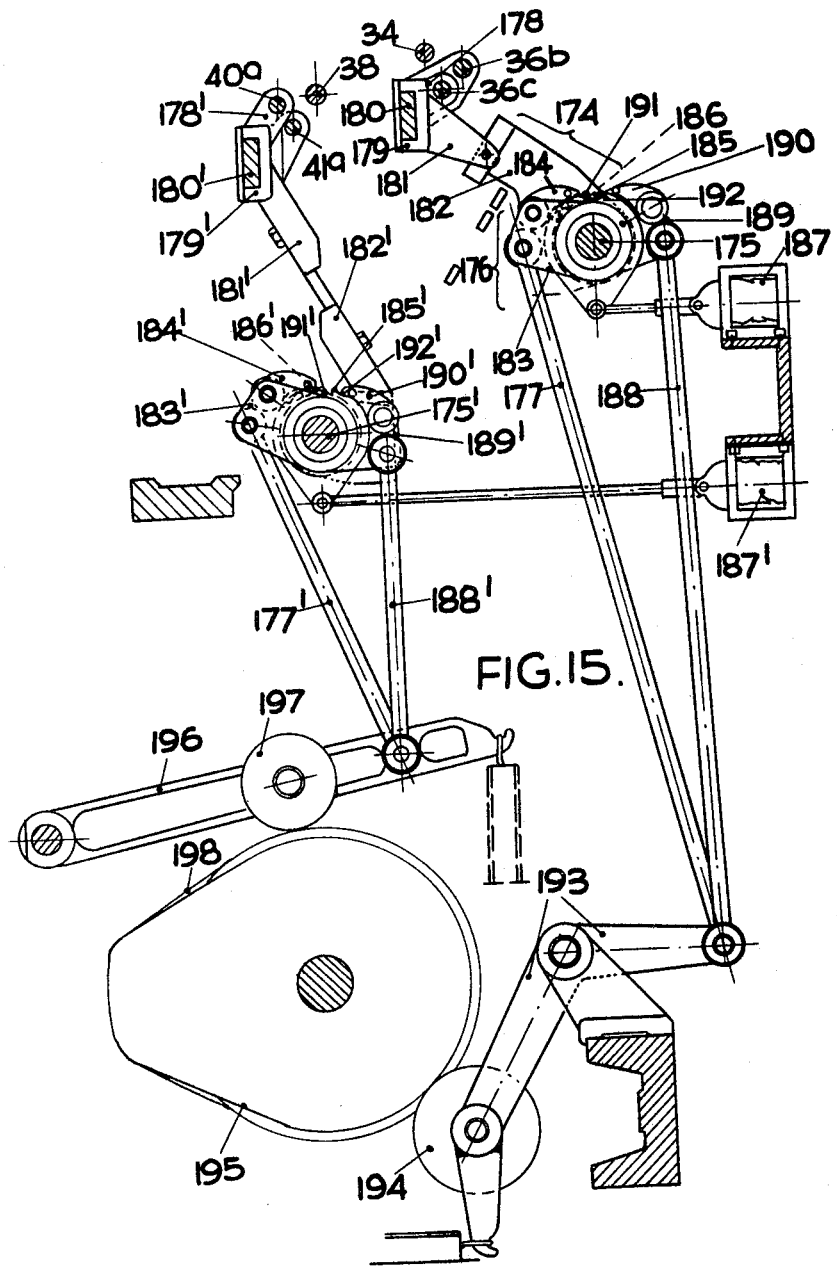

The foregoing and other features of the invention set out in the appended claims are incorporated in the construction which will be hereinafter described as a specific embodiment with reference to the accompanying drawings in which:

FIGURE 1 is a general cross sectional view of a straight bar knitting machine having lacing and fashioning mechanism, FIGURE 2 is an enlarged view of part of FIGURE 1, FIGURE 3 is an enlarged detail view of a loop transfer point and control element of the mechanism, FIGURE 4 is a perspective view of a relevant part of the machine, FIGURE 5 is a detail view of narrowing head operating mechanism in the machine, FIGURE 6 is a detail front view of point adjusting mechanisms, FIGURE 7 is a detail side view of one point adjusting mechanism, FIGURE 8 is a further detail side view of modified point adjusting mechanism, FIGURE 9 is a side view of pattern drum racking mechanism, FIGURE 10 is a side view of reset bar operating mechanism for selecting elements, FIGURE 11 is a side view of reset bar operating mechanism for the point controlling elements, FIGURE 12 is a side view of selvedge control drum rotary adjusting mechanism, FIGURE 13 is a plan view of the selvedge control drum rotary adjusting mechanism, FIGURE 14 is a scale view of selvedge control drum lateral adjusting mechanism, FIGURE 15 is a further side view of selvedge control drum lateral adjusting mechanism.

Referring to FIGURES 1, 2 and 4, a Cotton's patent straight bar knitting machine is represented by a needle bar 1 of bearded needles 2, a sinker bar 3 of sinkers 4, a knocking over bar 5 of knocking over bits 6, catch bar 7, thread carrier means 8, and a narrowing head, this being represented by blocks such as 9 and rods 10, 11, 12, and side arms such as 13a carrying the rod 11 and mounted on a pivot shaft 13. For operating the narrowing head to have dipping and rising motions about the axis of the shaft 13, as well as known in this type of machine for fashioning, the rod 11 is connected by a link 13b, FIGURE 4, to cam operating mechanism to be hereinafter described.

The blocks such as 9 comprise four spaced blocks 9 to 9c secured by screws 9d to the rod 11, and two spaced blocks 9e, 9f, and 9g, 9h, disposed between the blocks 9, 9a, and 9b, 9c respectively. To the blocks 9e, 9f is fixed integrally or by screws 14, 15, a half length bed plate 16 to which is fitted a half length row of loop transfer points 17, and to the blocks 9g, 9h is similarly fixed a half length bed plate 116 to which is fitted a half length row of similar points 17. These points 17 are of bent flexible type comprising a downwardly projecting point portion 17a, FIGURE 2, and an inclined shank portion 17b, which joins with the point portion at a bend 17c.

Secured by screws such as 18, 19 to the bed plates 16, 116 are guide bars such as 20, 21 having tricks for half length rows of point-controlling blade elements 22 which are frictionally held such as by a cover plate 123, 123a inserted behind flanges 20a, 20b, 21a, 21b of the guide bars 20, 21 and which correspond to the row of elements 22.

In the position shown in FIGURE 2, the narrowing head is in an upper position, and the elements 22 have upper portions 22a of at least some of the elements projecting upwardly from the bars such as 20.

The lower ends 22b of the elements 22, FIGURE 3, have a recess 22c and a lower inclined face 22d, and the elements 22 are relatively slidable in the guide bars 20, 21 first for their inclined face 22d to bear against the bends 17c of the points 17 and deflect the latter and then for the recess 22c to fit on the bends 17c thereof with a releasable engagement, as indicated by the two positions in FIGURE 3.

The elements 22, FIGURE 2, also have a butt 22e engageable by a reset bar 23 on a rocking rod 24 operated by means hereinafter described.

Disposed above the narrowing head is mounting means 25 for a main selecting mechanism. In this mechanism is a row of selector elements 26, also FIGURE 4, mounted pivotally on a pivot 27 carried by the means 25, FIGURE 2, and corresponding to the row of point-controlling elements 22. Each element 26 comprises a first arm 26a depending towards a point-controlling element 22 and at its lower end it has a central recess 26b and which spaces two downwardy projecting portions 26c, 26d. A second arm 26e of each element 26 has an upwardly directed projection 26f for cooperation with pattern bits 28a of a pattern drum 28 which is stationary relative to the narrowing head and is racked round by racking mechanism hereinafter described. A third arm 26h of each element 26 has a downwardly directed projection 26i, and the first arm 26a has a side edge projection 26j. Each element 26 is biased by a wire spring 29 of a mounting 30 and bearing against the first arm 26a in a direction urging the upward projection 26f of the second arm 26e towards the pattern drum.

The second arm 26e also has a tail part 26k for cooperation with a reset bar 31 on a rocking shaft 32 operated by means hereinafter described.

For cooperation with the downward projection 26i on the third arm 26h there are two outer narrow control drums 33, 133, FIGURES 1, 2 and 4, which are of such length and are disposed at such widely spaced locations along the row of elements 26 as to be operative on widely spaced groups of the elements 26 which, through corresponding point-controlling elements 22 and points 17, are associated with outer groups of selvedge needles. Each drum 33, 133 has a recess, such as 33a, FIGURE 2, formed with an inclined wall 33b and in which the projections 26i normally extend. Each drum 33, 133 is rotationally displaceable on a shaft 34 by an arcuately displaceable rod 35, through further means hereinafter described.

The drums 33, 133 are adjustably displaced towards and away from each other by adjustable lead screw means, through the intermediary of collars 36, 36a on spindles 36b, 36c, and engaging in arcuate slots in the drums, in synchronism with adjustment of fashioning lead screws, through further means hereinafter described.

There may be two inner control drums such as 37, 137 FIGURES 1, 2 and 4, constructed similar to the drums 33, 133 to be displaceable about a shaft 38 by an arcuately displaceable rod 39 and adjustable towards and away from each other by lead screw means through the intermediary of collars 40, 41, on spindles 40a, 41a and engaging in arcuate slots in the drums, and the spindles 40a, 41a being displaced by lead screws through further mechanism hereinafter described. In each drum 37, 137, is a recess such as 42 for receiving the projections 26j and each recess has inclined wall 42a. The drums 37, 137 are rendered ineffective on the arms 26a by each having a deep recess such as 42b alongside the recess 42 and disposed opposite to the projection 26j, and the drums 37, 137 are rendered effective by the rotational displacement thereof for the projection 26j to cooperate with the recess 42 and the incline 42a.

These additional control drums 37, 137 are of such length and disposed at such comparatively closely spaced locations along the row of elements 26 as to be operative on their adjacent groups of elements 26 which through corresponding point-controlling elements 22 and points 17 are associated with inner groups V-neck selvedge needles.

The third arm 26h, FIGURE 2, of each element 26 has a tail part such as 26l for cooperation with group pattern control bars 43a, 43b, 43c, 43d of a group pattern control drum 43 operated by means hereinafter described.

The novel mechanism above described is for forming lace patterns in parallel or fashioned fabric produced on the machine, the lace patterns being formed by selection of the point controlling elements 26 by the racking pattern drum 28 and by normal dipping and rising movements of the narrowing head accompanied by sideways displacements of the points to effect loop transferring operations on selected needles according to the selections of the point controlling elements 26.

For obtaining the dipping and raising movements of the narrowing head, the link 13b, FIGURE 4, from the rod 11 is connected, FIGURE 5, to a cam follower lever 13c having a cam follower 13d for operation by plain and fashioning cams 13f, 13e on the machine's main cam shaft 50 at required different times, the change from one cam to the other being effected by operation of the usual shogging means to shog the cam shaft 50.

For obtaining the sideways displacements of the points, the rod 12, FIGURE 4, is secured to the bed plate 16 by screws 12a in the blocks 9e, 9f, the rod 10 is secured to the bed plate 116 by screws 10a, in the blocks 9h, 9g, and the two rods are displaceable towards and away from each other by the following cam operated mechanism, FIGURE 6.

The rod 10 carries spaced adjusting screws 51, 52 on opposite sides of a finger 53, see also FIGURE 4, which projects from a sleeve 54 slidable on a support rod 55, and the rod 12 carries spaced adjusting screws 56, 57 on opposite sides of a finger 58 which projects from a sleeve 59 slidable on the support rod 55.

The sleeves 54, 59 are spaced a small distance apart and on their inner ends are rollers 60, 61 which by virtue of a tension spring 62 are biased to engage a cam bar 63 having side ramp faces 63a, 63b.

The cam bar 63 is mounted for slidable displacement vertically in a mounting bracket 64 and for effecting the displacement the cam bar 63 carries a lower hook finger 65, also FIGURE 7, to be hooked onto an axle 66 of a cam follower 67 carried by a cam follower arm 68 and operable by a cam 69 on the main cam shaft 50.

For engaging and disengaging the hook finger 65 with the axle 66, it is connected by a link 70 to a pivoted arm 71, FIGURE 7, which is connected by a link 72 to a solenoid 73.

Similarly there is a second pair of rollers such as 74 engaged by a second cam arm 75 slidable vertically in the bracket 64 and carrying a lower hook finger 76 also for hooking onto the axle 66. For this purpose the hook finger 76 is connected by a link 77 to a second arm 78 connected by a second link 79 to a second solenoid 80.

It will thus be seen that either of the cam arms 63, 75 can be rendered operative and inoperative by operations of the solenoids 73, 80, the action of the ramp faces such as 63a, 63b being then to displace the rods 10, 12 in opposite directions or allow their displacement in the reverse opposite directions. The cam arms 63, 75 have different ramp faces to provide for the displacements being to different extents, say one or two needle distances for transferring of loops in lace patterning say one or two needle distances. Evidently either or both of the cam arms can be changed to provide other ramp faces say for three or four needle distance loop transferring.

For optional use instead of using the cam arm's ramp faces, there is a lead screw 81, FIGURES 6, 8, extending through a screw nut formation in the bracket 64, and the axle 66 is elongated so that operation of the lead screw will cause the required displacements of the rods 10, 12. The lead screw is operated by opposite ratchet wheels 82, 83, opposite pawls 84, 85 and stop pawls 86, 87. The pawls 84, 85, FIGURE 8, are operated by being mounted on a cam follower arm 88 having a cam follower 9 engaging a cam 90 on the cam shaft 50. The operation of the pawls is selective, the pawls 84, 87 having cam plates 91, 92 engaging rollers 93, 94 carried by a link 95 which interconnects arms 96, 97 whereof the arm 97 is connected by a link 98 to a solenoid 99, and the pawls 85, 86 having similar cam plates engaging rollers on links which interconnect similar arms whereof one arm is connected by a link 101 to a solenoid 102.

Racking mechanism for the patterning drum 28 comprises opposite ratchet wheels 103, 104, FIGURES 1, 4 and 9, with associated indexing wheels 105, 106, and pawls 107, 108, FIGURE 9, carried by levers 109, 110 freely mounted on a spindle 112 for the drum 28, and ratchet wheels 103, 104. There are also pawl control plates 107a, 108a free on the spindle 112. The pawls 107, 108 are operated in opposite directions through link and lever connections 113, 113a, 113b, 114 from levers 109, 110 to arms 15, 16 connected by springs such as 115a to two pairs of hook arms such as 118, 119. In each pair of the hook arms, the hooks, such as 119a, are formed by different length recesses such as 118b, 119b and are releasably engageable with a peg 120 on an arm 121 connected by a link 122 to a cam follower lever 123 having a cam follower 124 engaging a cam 125 on the shaft 50.

The pawls 107, 108 are operable selectively by solenoids such as 126, 127. Two pairs of solenoids such as 126 operate two pairs of control levers 128, 129 to determine which of the four hook arms such as 118, 119 are in operative position engaging the peg 120 thereby determining which of the pawls 107, 108 is operated by the cam 125, and also whether single or double tooth racking is required as provided by the different length recesses such as 118b, 114b. Two solenoids such as 127 operate the control plates 107a, 108a which cooperate with tails of the pawls 107, 108 thereby to engage and disengage the pawls according to which is to be effective on its ratchet wheel.

The racking of the pattern drum 28 presents different arrangements of the butts 28a to set the elements 26 in different positions whereby the point-controlling elements 22 are selected in a manner hereinafter described.

For operating the reset bar 31 for the elements 26, the spindle 32, FIGURE 10, carries an arm 132 connected by a link 132a to a lever 134 on a pivot shaft 135, and the lever 134 is connected by a link 136 to a cam follower lever 138 having a cam follower 138a engaging a cam 139 on the shaft 50.

The cam follower 138 is rendered operable and inoperable under control of a solenoid 147 connected by a link 149 to a pivoted prop 151 which is releasably engageable under the free end of the cam follower lever 138.

For operating the reset bar 23 for the point-controlling elements 22, the shaft 24, FIGURE 11, carries an arm 140 having a peg 141 which projects into a slot 142 in a bar 143 attached to a machine frame part 144, so that when the narrowing head dips for the second time in each loop transferring operation, this dip, which is to slightly greater extent than the first dip, causes the peg 141 to be held by the lower end of the slot 142 so that the reset bar 23 is held to arrest the downward movement of the butts 22a whereby the point-controlling elements become reset.

For rotationally displacing the inner selvedge control drums 37, 137, for V-neck fashioning control, their spindle 38, FIGURES 12, 13, is connected by arm 152 and link 153 to arm 154 from which project hook arms 155, 156. These hook arms 155, 156 are for releasable engagement with a peg 157 projecting from an arm 158 connected by a link 159 to a bell crank lever 160 and the latter is connected by a link 161 to a cam follower lever 162 having a cam follower 163 engaging a cam 164 on the shaft 50. The hook arms 155, 156 are engaged with the peg 157 selectively under control of solenoids 165, 166 which are connected by links 167, 168 to control levers 169, 170 bearing against the hook arms 155, 156 to lower them selectively. The hook arms 155, 156 are of different lengths as shown to provide in one instance for one extent of movement for introducing the control drums and for a greater extent of movement for operation of the control drums.

The mechanisms for the inner control drums 37, 137 on the spindle 38 is substantially duplicated for the outer control drums 33, 133, on the spindle 34, for outer selvedge fashioning control, so that no further description is required but the various parts are identified by like reference numerals raised to the first degree, and the different extents of movement are for operating control drums first for the fashioning and then if required for controlling filling up points as hereinafter described.

Since it is also required to adjust the control drums 33, 133, 37, 137 laterally for widening or narrowing they are not fixed on the spindles 34, 38, but instead the rods 35, 39 which are engaged in slots in the control drums, are carried from the spindles 34, 38 by arms such as 172, 173 (for rod 35) FIGURE 14, so that the rods 35, 39 have arcuate movements from the spindles 34, 38 and carry the control drums with them.

For the lateral movements of the control drums 33, 133, 37, 137 the rollers such as 36, 36a, FIGURE 14, which engage in slots in the control drums, are moved laterally by their spindles such as 36b being connected by slide screw nuts such as 174 to lead screws such as 175 which are operated, by suitable racking and control mechanism 176, including links such as 177 connected to cam operating mechanism with a cam on the shaft 50, substantially as in usual selvedge stop adjustable lead screw mechanism.

Two such mechanisms for adjustment of the control drums 133, 137 are shown in further detail in FIGURE 15, it being understood that similar mechanisms are provided for adjustment of the control drums 33, 37. In this FIGURE 15 the slide 174 of FIGURE 14 for adjustment of the control drum 133 is shown as comprising an arm 178 connecting the rod 36c to a slipper 179 on a guide bar 180 and the slipper 179 is connected by an arm 181 to a screw nut device 182 on the lead screw 175. The racking and control mechanism 176 of FIGURE 14 is shown as comprising the link 177 connected to an arm 183 free on a plain part of the lead screw 175 and carrying a pawl 184 acting on a ratchet wheel 185 under selective control of a control disc 186 also free on the plain part of the lead screw and rotationally displaceable, to raise or lower the pawl 184, by a solenoid 187. A second link 188 is connected to a second arm 189 carrying a second pawl 190 opposed to the pawl 184 and acting on a second ratchet wheel 191 opposed to the ratchet wheel 185, and pawl 190 being under control of a second control disc 192 rotationally displaceable, to raise and lower pawl 190, by a second solenoid such as the solenoid 187.

For the control drum 137 the mechanism is shown in FIGURE 16 substantially identical to that shown for the control drum 133 and therefore needs no further description but the various parts are identifiable by like reference numerals raised to the first degree.

The links 177, 188 are connected to a cam follower lever 193 having a cam follower 194 engaging a cam 195 on the cam shaft 50, and the links 177′, 188′ are connected to a cam follower lever 196 having a cam follower 197 engaging a cam 198 on the shaft 50, it being understood that these cams operate the pawls constantly, the pawls being selected for effective operation when required by the solenoids.

It will be understood that the machine is primarily for making knitted fabric with any desired lace patterns by loop transference, the fabric being wholly or in part either parallel or fashioned by narrowing or widening.

In for example parallel fabric the pattern drum 28 is set out with pattern bits 28a according to a desired pattern generally extending for a length of the drum corresponding to the widest fabric to be made. Initially the selector elements 26 will be held clear of the pattern drum 28 by the reset bar 31. Each time a pattern bit, by racking of the pattern drum 28, is presented to a projection 26f, the reset bar is then raised by the cam 139, and the associated selector element 26 is disposed as shown in FIGURE 1, with the space 26b in the first arm 26a in alignment with the corresponding point-controlling element 22. For each racked position of the pattern drum therefore there will be a selection of the selector elements 26 thus disposed while the remaining selector elements 26, by virtue of there being no pattern bits 28a, will be disposed with the lower projection 26d of the first arm 26 in alignment with the corresponding point-controlling element 22, bearing in mind that the reset bar 31 will be in an upper clear position, and that the narrowing head will be in a lower position than that shown. This is with the exception of those selvedge groups of selector elements 26 which register with the outer control drums 33, 133, these selvedge selector elements being prevented, by engagement of their projections 26i on the third arm 26h with the base of the recesses such as 33a in the outer control drums 33, 133 from action by the pattern drum so that these selvedge selector elements will all present their spaces 26b in alignment with the corresponding point-controlling elements 22. Furthermore if V-neck fashioning is not required, the inner control drums 37, 137 will be as shown out of action so as not to affect their associated selector elements 26.

The narrowing head is operated by the cam 13e for each course in which patterning is required, and in the first raising movement of the head, the upper end portions 22a of the point-controlling elements 22 either enter the recesses 26b or strike against the projection 26d of the selector elements 26 according to how they have been selected by the pattern drum.

Those point-controlling elements 22 which do not strike the projections 26d remain unaffected so that their points 17 remain undeflected, whereas those point-controlling elements 22 which strike projections 26d are held thereby in the down position while the narrowing head continues to rise. Therefore the lower ends 22b of these point-controlling elements bear against the bends of their points 17 and deflect the latter, the point-controlling elements remaining in this position by virtue of the bends of the points catching in the recesses of the elements 22.

Following the raising of the narrowing head to thus effect selection of the points by deflecting a selection of them, the narrowing head next lowers, by the cam 13e, and those points which are not deflected do not engage with the needles, whereas the remaining points which are deflected box with their needles. This is followed by sideways loop transferring operations being carried out over a desired number of needles and in required direction by appropriate operation of the solenoids such as 73, 80 and cam 69, or solenoids 99 and cam 90, but only from those selected needles with which the points are boxed, it being appreciated that the remaining needles including the groups of selvedge needles registering with the outer control drums 33, 133 will not have their loops transferred.

This sequence of operations, followed by operation of the reset bars 23 and 31 to reset the point-controlling elements 22 and the selecting elements 26, will be repeated for as many courses as desired and with the pattern drum racking to change the selections of the elements, points, and needles, as desired, to provide the required lace patterning, and with the pattern being blanked out on the outer groups of selvedge needles so that only plain jersey fabric is made on these needles.

The outer control drums 33, 133 may also be used for fashioning, i.e., widening or narrowing, at the outer selvedges and the inner control drums 37, 137 may also be used for fashioning at inner selvedges for a V-neck if required. For these purposes when inner and outer widenings or narrowings are to be effected the control drums are all rotatably displaced, by operation of the solenoids 165, 166, 165', 166' and cam 164, so that the projections such as 26i, and projections such as 26j, of the elements 26 ride up the inclined faces such as 33b and 42a of the control drums. The effect of this is for inner and outer groups of selvedge selector elements 26 to carry their lower projections such as 26c into alignment with the corresponding groups of point-controlling elements 22 so that these groups only of the elements 22 will be held down while the narrowing head rises, and their associated points only will be deflected to subsequently box with the needles when the narrowing head next lowers in a fashioning operation.

For the necessary sideways loop transferring operations the two beds 16, 116 of points 17 and point-controlling elements 22 are then appropriately displaced sideways, by operation of the solenoids 73, 80 and cam 69 or of the solenoids 99, 102 and the cam 90, one or two needle distances, from outer positions inwardly for narrowing and from inner positions outwardly for widening. The accompanying necessary outward or inward adjustments of the control drums are effected by operation of the adjustable lead screws 175, 175' under control of the solenoids 187, 187' and the cams 195, 198. This is followed by the second dipping of the narrowing head in which the reset bar 31 is operated by the cam 139 to take up the position shown in FIGURE 2 in which it will maintain inactive those selectors 16 situated between the inner and outer groups of selvedge selector elements thus holding them clear of the pattern bits 28a, and the reset bar 23 is operated by slotted bar 143 acting on the peg 141.

In addition to controlling the groups of selevedge selector elements 26 to loop transfer for fashioning, the outer control drums 33, 133 are adapted for controlling filling up points for spreading a loop over two needles when widening. For this purpose the outer control drums 33, 133 are provided on their peripheries, and at the inner sides thereof, with a narrow lobe such as 33c, FIGURE 1, and there is effected rotary displacement of the drums 33, 133 to the aforesaid greater extent through operation of the hook bars 155, 155', so that the lobes such as 33c act on one or two only of the selector elements 26 at the inner sides of the outer selvedge groups of selector elements 26 to cause by the first dip of a second motion of the narrowing head, their associated points 17, in this instance half points, to enter the loops on their associated needles and, by virtue of the following sideways movement and second dip of the narrowing head, to spread these loops to adjacent needles, the needles in these two operations being operated in usual manner for half points to a height less than the full height.

It is to be understood that timing of the various operations is effected by suitable relationship between the various cams on the cam shaft 50, and by selective operation of the various solenoids at required times under control of any suitable electric programming mechanism such as of punched chart and reader means type.

The group pattern drum 43 is for optional use and can be operated, by a hand lever 43a cooperating with an indexing wheel 43b, to present any one of the pattern bars 43s–43d to the tail portions 26l of the selector elements, the bars having cut out so that at these locations the patterning by the pattern drum 28 is blanked out for as many courses as desired and in different groups of courses, as desired and in different groups of courses, as desired.

An advantage of the point-controlling arrangement is that the point-controlling elements 22, being slidably mounted have a constant firm tension control of the points, and the recesses engaging the bends of the points avoid the necessity for springs to hold the elements 22 in the down position when the narrowing head lowers.

An advantage of the selecting element arrangement is that the selecting mechanism is completely separate from the narrowing head and is held stationary so that the re- action between the elements 22 and 26 is obtained simply by the rising motions of the narrowing head.

An advantage of the general arrangement is that the same row of elements 22 is employed for the lace patterning and for the fashioning operations, and the same control drums are used not for blocking out patterning at the selvedges but also providing for the actual widening or narrowing by the selvedge points.

A further advantage of the general arrangement is that the width of fabric can be very readily changed simply by operating the control driving and adjusting them outwardly or inwardly It is to be understood that modifications may be made within the scope of the invention, for example, instead of using filling-up points after widening, the narrow lobes such as 33c may be at the outer sides of the outer control drums and operated to effect the widening on two selvedge needles only, the remainder of the outer control drums not being used for widening.

What we claim is:

1. A straight bar knitting machine for effecting lace patterning, fashioning, and the like, including a narrowly head, a row of flexible loop transfer points operable in the narrowing head, a row of point controlling elements movable with the narrowing head and displaceable therein between an inoperative position and an operative position deflecting the points into position for cooperation with the needles, a selecting mechanism disposed for selective cooperation with the point controlling elements, means for effecting relative cooperating movements between the narrowing head and the selecting mechanism and said selecting mechanism comprising a row of selector elements, movable for interaction with corresponding point-controlling elements to deflect corresponding points leaving the remaining points undeflected, and means for pattern controlling said selector elements comprising a pattern drum disposed over the selector elements for the latter to be selectively operable directly from the pattern drum.

2. A straight bar knitting machine for effecting lace patterning lace patterning, fashioning, and the like including a narrowing head, a row of flexible loop transfer points operable in the narrowing head, a row of point controlling elements movable with the narrowing head and displaceable therein between an inoperative position and an operative position deflecting the points into position for cooperating with the needles, a selecting mechanism disposed for selective cooperation with the point controlling elements, means for effecting relative cooperating movements between the narrowing head and the selecting mechanism, said point controlling elements including selvedge groups thereof, and control devices for control of said selvedge groups of the point controlling elements.

3. A straight bar knitting machine for effecting lace patterning, fashioning, and the like, including a narrowing head, a row of flexible loop transfer points operable in the narrowing head, a row of point controlling elements movable with the narrowing head and displaceable therein between an inoperative position and an operative position deflecting the points into position for cooperating with the needles, a selecting mechanism disposed for selective cooperation with the point controlling elements, means for effecting relative cooperating movements between the narrowing head and the selecting mechanism, said selecting mechanism comprising a row of selector elements, movable for interaction with corresponding point-controlling elements to deflect corresponding points leaving the remaining points undeflected, and means for pattern controlling said selector elements comprising a pattern drum disposed over the selector elements for the latter to be selectively operable directly from the pattern drum, said point controlling devices including selvedge groups thereof and control devices for control of selvedge groups of the point controlling elements.

4. A straight bar knitting machine for effecting lace patterning, fashioning, and the like, including a narrowing head, a row of flexible loop transfer points operable in the narrowing head, a row of point controlling elements movable with the narrowing head and comprising frictionally mounted sliders which are selectably slidable from the inoperative position to an operative position deflecting the points for cooperation with the needles and having a releasable catch engagement therewith, a selecting mechanism disposed for selective cooperation with the point controlling elements, and means for effecting relative cooperating movement between the narrowing head and the selecting mechanism.

5. A machine as claimed in claim 2 including a pattern drum wherein the selecting mechanism includes selector elements which are formed with a portion for cooperation at one location with the pattern drum, a portion for cooperation at another location with the point controlling elements, and portions for cooperation at further locations with the control devices to blank out the pattern.

6. A machine as claimed in claim 5 wherein the portion for cooperating with the point controlling elements comprises spaced downwardly projecting portions, wherein the selector elements are pivotally mounted for selective displacements, and the displacements are in one direction by the pattern drum to present one of the downwardly projecting portions to the point controlling elements, and in the opposite direction by the control devices to present the other downwardly projecting portion to the point controlling element.

7. A machine as claimed in claim 2 wherein the control devices are narrow drums which have plain surfaces for blanking out the pattern, peripheral recesses for rendering of the drums operative and inoperative, and which are adjustably displaceable both rotationally and laterally under control of cam operated mechanism and solenoid controlled trip mechanism for blanking out the pattern and fashioning purposes.

8. A straight bar knitting machine lacing mechanism comprising in a narrowing head, a row of loop transfer points which correspond to a row of fabric forming needles and which are capable of being deflected to adopt an operative attitude suitable for loop transferring cooperatin with the needles and an inoperative attitude for noncooperation with the needles when the narrowing head is moved towards the needles, a row of paint-controlling elements which corresponds to the row of points and which are capable of being displaced in the head to operative position deflecting the points and to inoperative position not deflecting the points, said row of point controlling elements being divided into two side half groups, rods movable in opposite directions for displacing said half groups towards and away from each other, cam operated mechanism for controlling said rods, solenoids for controlling said cam operated mechanism, a selecting mechanism comprising a row of selector elements which are movable for interaction with corresponding paint-controlling elements to deflect corresponding points leaving the remaining points undeflected, resetting means for resetting those elements which are thus operatively selected, mounting means for mounting the selecting mechanism stationarily adjacent the narrowing head with portions of the selector elements selectively movable into and out of a position in operative alignment with portions of the point controlling elements for the interaction of the elements to be effected by movement of the narrowing head towards the stationary selecting mechanism, said point controlling elements including sel-vedge groups thereof and control devices for control of said selvedge groups of point-controlling elements.

9. A machine as claimed in claim 2 wherein the control devices comprise two control devices for outer selvedge groups of the selector elements for outer selvedge fashioning control, and two further control devices for inner selvedge groups of the selector elements for V-neck fashioning control.

10. A machine as claimed in claim 9 wherein the outer control devices are adapted for control of filling up points, or outer fashioning points.

11. A straight bar knitting machine lacing mechanism comprising, in a narrowing head, a row of loop transfer points which correspond to a row of fabric forming needles and which are capable of being deflected to adopt an operative attitude suitable for loop transferring cooperation with the needles and an inoperative for noncooperation with the needles when the narrowing head is moved towards the needles, a row of point-controlling elements which correspond to the row of points and which are capable of being displaced in the head to operative position deflecting the points and to inoperative position not deflecting the points, a selecting mechanism comprising a row of selector elements which are movable for interaction with corresponding point-controlling elements to deflect corresponding points leaving the remaining points undeflected, resetting means for resetting those elements which are thus operatively selected, mounting means for mounting the selecting mechanism stationarily adjacent the narrowing head with portions of the selector elements selectively movable into and out of position in operative alignment with portions of the point controlling elements for the interaction of the elements to be effected by movement of the narrowing head towards the stationary selecting mechanism, said point controlling elements including selvedge groups thereof and control devices for control of selvedge groups of the point controlling elements.

References Cited

UNITED STATES PATENTS

| 614,599 | 11/1898 | Aldridge | 66—96 |
| 2,035,960 | 3/1936 | Heinitz | 66—96 |
| 2,149,986 | 3/1939 | Welker | 66—96 |
| 2,198,846 | 4/1940 | Tesse | 66—96 |
| 3,141,316 | 7/1964 | McCarthy et al. | 66—89 XR |
| 3,292,395 | 12/1966 | Bentley et al. | 66—89 XR |
| 3,394,554 | 8/1968 | Start et al. | 66—89 |

FOREIGN PATENTS

| 604,537 | 5/1926 | France. |
| 638,136 | 5/1928 | France. |
| 703,445 | 4/1931 | France. |
| 797,258 | 4/1936 | France. |
| 831,645 | 9/1938 | France. |
| 389,349 | 3/1933 | Great Britain. |
| 440,070 | 1/1927 | Germany. |
| 537,240 | 1/1931 | Germany. |
| 545,216 | 2/1932 | Germany. |
| 545,930 | 3/1932 | Germany. |
| 630,794 | 6/1936 | Germany. |
| 742,040 | 11/1943 | Germany. |

RONALD FELDBAUM, Primary Examiner

U.S. Cl. X.R.

66—89, 154

PO-1050
(5/69)

UNITED STATES PATENT OFFICE
CERTIFICATE OF CORRECTION

Patent No. 3,503,226           Dated March 31, 1970

Inventor(s) Herbert E. Woodcock, Francis Simpson, William Clayton

It is certified that error appears in the above-identified patent and that said Letters Patent are hereby corrected as shown below:

Column 3, line 42 "as well as known" should read
   --as well known--.

Column 9, line 62 "43 s" should be --43 a--.

Column 10, line 6 After "not" insert --only--.

Column 10, line 22 change "narrowly" to
   --narrowing--

Column 11, line 57 change "paint" to --point--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents